Patented Jan. 3, 1950

2,493,090

UNITED STATES PATENT OFFICE 2,493,090

COMPOSITION OF MATTER

Robert S. Shelton, Mariemont, and Keith W. Wheeler, Wyoming, Ohio, assignors to The Wm. S. Merrell Company No Drawing. Application August 13, 1946, Serial No. 690,346

3 Claims. (Cl. 260—348)

This invention relates to new compositions of matter, more particularly to a new group of epoxyalkyl and epoxycycloalkyl amides.

The new compounds of my invention may be represented by the structural formula

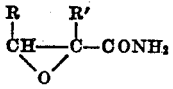

Where R and R' represent alkyl groups of 1 to 3 carbon atoms. In general they are crystalline solids, soluble in the common organic solvents, and are moderately to difficultly soluble in water at ordinary temperatures.

The new compounds may be prepared by oxidizing the corresponding unsaturated aliphatic or alicyclic amide by monoperphthalic acid, in a dry organic solvent. To avoid decomposition of the peracid reagent and the epoxide product it is important that the reactants be maintained in a dry state. For this purpose a desiccant such as anhydrous magnesium sulphate is advantageously included in the reaction mixture. The glycidamides may be recovered from the solution by evaporation and extraction, and may be purified by recrystallization.

These new glycidamides possess valuable properties as hypnotics and sedatives and may be administered orally, e. g. as capsules or tablets, or parenterally, e. g. as an aqueous or saline solution, for purposes for which such therapeutic agents are used.

The following examples illustrate the production of certain of the new compounds, but the invention is not limited thereto.

Example I

2 - ethyl - 3 - propylglycidamide.—Sixty-five parts (0.46 mole) of 2-ethyl-2-hexenamide are dissolved in 2245 parts of a dry ether solution containing approximately 1.18 moles of monoperphthalic acid. The resulting solution is treated with a little anhydrous magnesium sulfate and stored in a refrigerator at 8–10° C. The course of the reaction is followed by removing a sample of the solution and titrating the iodine formed upon treating the sample with a solution of potassium iodide. At the end of six days the reaction is complete. After the magnesium sulfate is filtered off, the ether solution is treated with a little water to destroy the excess monoperphthalic acid. The ether is removed by distillation or evaporation and the white residue dried under vacuum. The desired product is then extracted from the residue by means of boiling chloroform, leaving behind the bulk of the phthalic acid. The chloroform extract is washed with sodium carbonate solution, dried, and then the chloroform is evaporated off. The crude product thus obtained is recrystallized from a naphtha solvent (Skellysolve C) to yield about 42 parts of white or cream-colored needles, melting at 90–91° C. Concentration of the filtrate yields a second crop of 8 parts of slightly less pure product. The total of 50 parts of 2-ethyl-3-propylglycidamide represents 69 per cent of theoretical. The compound is soluble 1:95 in water at 30° C., and is fairly soluble in the common organic solvents.

Example II

2 - propyl - 3 - ethylglycidamide.—Nine parts (0.064 mole) of a mixture of the cis and trans isomers of 2-propyl-2-pentenamide is dissolved in 420 parts of an ether solution containing approximately 0.19 mole of monoperphthalic acid. The solution is treated with anhydrous magnesium sulfate and kept in a refrigerator at 8–10° C. for nine days. At the end of this time, the solution is filtered, and water is added to the filtrate to destroy the excess monoperphthalic acid. The solution is then evaporated to dryness and finally dried under vacuum. The white residue is extracted repeatedly with hot chloroform. The chloroform solution is washed with dilute sodium carbonate solution, dried, and the chloroform removed, leaving a residue of crude 2-propyl-3-ethylglycidamide. This material is recrystallized from a naphtha solvent (Skellysolve C) giving 8.5 parts of product, which represent 85 per cent of theoretical. After two more recrystallizations, the pure product melts at 99–100° C. It is soluble 1 part in 80 in water at ordinary temperature, and is fairly soluble in the usual organic solvents. The material crystallizes as clusters of very fine white needles.

Example III 2,3 - diethylglycidamide. — 2,3 - diethylacrylamide is treated with monoperphthalic acid as in the preceding examples, to yield the glycidamide in the form of white crystals, somewhat soluble in water and soluble in organic solvents.

Example IV 2,3 - dipropylglycidamide. — 2,3 - dipropylacrylic acid is prepared in a manner similar to the diethyl homologue, and from this in turn the acid chloride and amide are obtained. This unsaturated amide when treated with monoperphthalic acid as in the preceding examples gives the desired 2,3-dipropylglycidamide in the form of white crystals, somewhat soluble in water and soluble in organic solvents.

Other compounds included in the invention, and having hypnotic properties, include 2-methyl-3-propyl-glycidamide
    2-propyl-3-methyl-glycidamide

We claim:
1. 2,3-alkyl substituted glycidamides where the alkyl substituents contain 1 to 3 carbon atoms.
2. 2-ethyl-3-propyl glycidamide.
3. 2-propyl-3-ethyl glycidamide.

ROBERT S. SHELTON.
                KEITH W. WHEELER.

REFERENCES CITED

The following references are of record in the file of this patent:

FOREIGN PATENTS

| Number | Country | Date |
|---|---|---|
| 586,645 | Germany | Oct. 1933 |

OTHER REFERENCES

Gilman, "Organic Chemistry an Advanced Treatise," vol. 1, 2nd edition, p. 634, John Wiley & Sons, N. Y., 1943.

Rice, "Journal of the American Pharmaceutical Association," Scientific edition, vol. 33, No. 9, Consecutive No. 17, September 1944, pp. 292–293.

Chemical Abstracts, vol. 30, page 5499, paragraph 2.